United States Patent [19]

Sauber

[11] Patent Number: 4,633,564
[45] Date of Patent: Jan. 6, 1987

[54] TORSION BAR STABILIZER FOR A VEHICLE AND METHOD FOR MOUNTING THE STABILIZER ON THE VEHICLE FRAME

[76] Inventor: Charles J. Sauber, 10 N. Sauber Rd., Virgil, Ill. 60182

[21] Appl. No.: 594,696

[22] Filed: Mar. 29, 1984

[51] Int. Cl.⁴ .................. B21K 21/16; B23P 17/04; B23P 23/00
[52] U.S. Cl. .................. 29/401.1; 29/526 R; 267/25; 280/689; 280/718
[58] Field of Search .................. 267/25, 27, 29, 32, 267/46, 48, 51, 54 R, 57, 57.1 A, 151, 154, 11 R; 280/686, 689, 718; 29/401.1, 526 R

[56] References Cited

U.S. PATENT DOCUMENTS

| 2,264,174 | 11/1941 | Crump et al. | 280/718 |
| 2,768,000 | 10/1956 | Saives | 280/718 |
| 2,841,404 | 7/1958 | Eitel | 280/718 X |
| 3,448,994 | 6/1969 | Posnikoff | 280/718 |

FOREIGN PATENT DOCUMENTS

| 205700 | 1/1957 | Australia | 280/689 |
| 260149 | 10/1926 | United Kingdom | 267/54 R |

Primary Examiner—Douglas C. Butler
Assistant Examiner—Michael P. Gilday
Attorney, Agent, or Firm—Leydig, Voit & Mayer

[57] ABSTRACT

A stabilizing mechanism and a method of mounting the stabilizing mechanism are provided. The stabilizing mechanism is supported on modified overload stops which are mounted onto the truck frame through mounting holes drilled by the truck's manufacture and intended as mountings for conventional overload stops; in addition, linkages fixedly coupled to the longitudinal ends of the torsion bar directly couple each end of the torsion bar to one of the leaf springs of the truck frame. Differential compression of the leaf springs twists the torsion bar which produces a reactive torque at the longitudinal ends of the torsion bar. In response to this reactive torque, the linkages fixedly coupled to the torsion bar transfer the torque to a linear force which opposes the differential compression of the leaf springs. In order to couple the leaf springs to the torsion bar linkages, the top brackets in the bracket assemblies which secure the leaf springs to the wheel axle of the vehicle are replaced by modified top brackets. The modified brackets include integral pedestals which provide mountings for the torsion bar linkages. Both the modified overload stops and the modified top brakcets replace the original stops and brackets without any need for modifying the vehicle frame or the bracket assemblies securing the leaf springs to the vehicle's wheel axle.

6 Claims, 3 Drawing Figures

U.S. Patent   Jan. 6, 1987   4,633,564
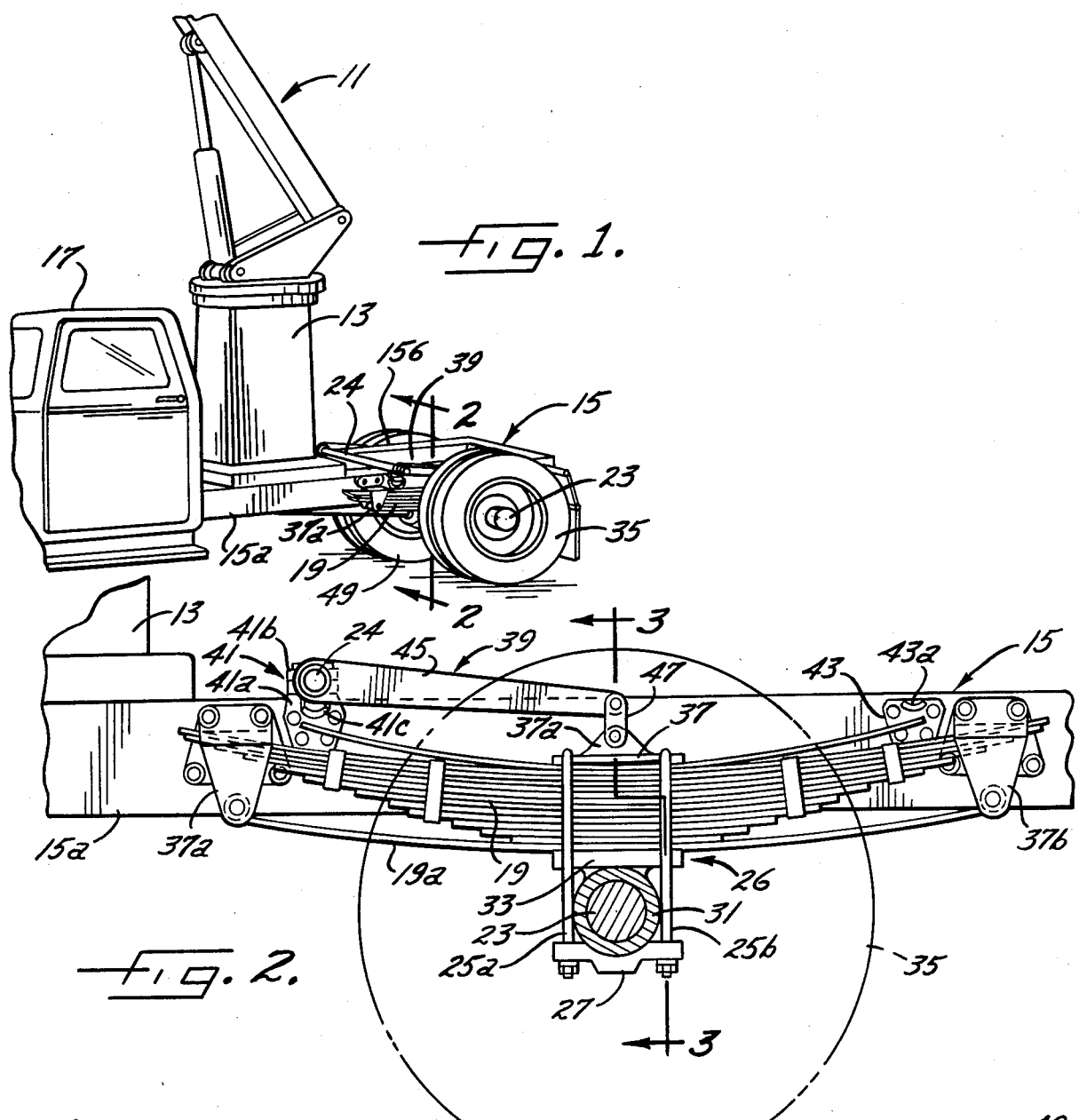
fig. 1.
fig. 2.
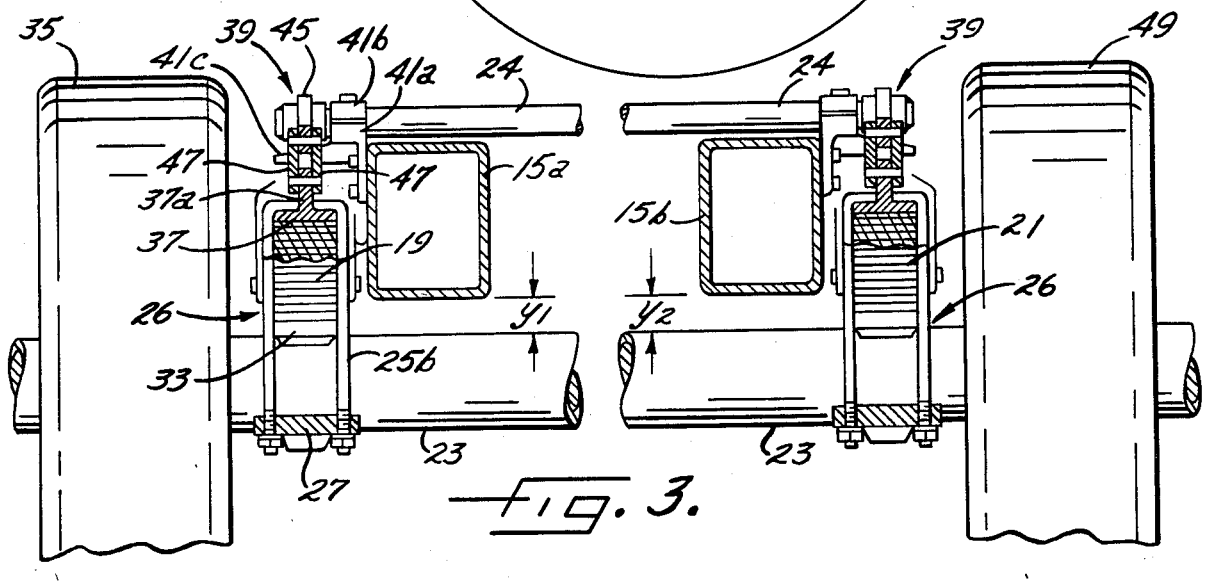
fig. 3.

TORSION BAR STABILIZER FOR A VEHICLE AND METHOD FOR MOUNTING THE STABILIZER ON THE VEHICLE FRAME

FIELD OF THE INVENTION

The invention generally relates to booms pivotably mounted on mobile platforms and, more particularly, to improved stabilizing mechanisms for vehicles carrying mobile platforms and methods for mounting the stabilizing mechanisms.

BACKGROUND

For a boom or the like which is pivotably mounted on a mobile platform, it is typically a problem providing adequate stability for the boom as it pivots and extends about its mounting in a cantilevered manner. As the boom moves, its center of gravity changes so as to cause a fluctuating distribution of the weight on the platform which often results in the weight being heavily biased to one side or corner of the platform. Since the mobile platform is typically supported on a spring suspension system, this shifting of the boom's center of gravity over the surface of the platform tends to cause the platform to sway or move away from a stable horizontal position to an extent proportional to the weight being lifted by the boom. Accordingly, many types of stabilizing mechanisms have been utilized to dampen this undesirable and dangerous tilting of the platform which results from the unavoidable movement of the boom and its lifting of heavy weights.

It is a common industry practice to adapt general purpose truck-type vehicles to the special application of providing mobile platforms for booms. In order to inhibit undesirable tilting of the truck frame and the boom and platform mounted thereon, a stabilizing mechanism is often added to the vehicle. Unfortunately, the addition of a stabilizing mechanism often requires the modification of the truck frame (e.g., the suspension system). The requirement of modifying the truck frame in order to mount a stabilizing mechanism on the vehicle creates a risk that the truck frame, when modified, may structurally weaken the vehicle. In particular, drilling into the frame of the truck in order to mount a stabilizing mechanism may dangerously change the structural integrity of the truck frame.

SUMMARY OF THE INVENTION

It is a primary object of the invention to provide a stabilizing mechanism for and a method of mounting the stabilizing mechanism to, a general purpose vehicle frame, carrying a platform mounted boom or the like, which can be added to the vehicle frame without disturbing the structural integrity of the frame. In this connection, it is a related object of the invention to provide a stabilizing mechanism for, and a method of mounting the stabilizing mechanism to, a general purpose truck frame supporting a boom platform or the like which can be easily and quickly mounted to the existing truck frame to provide increased side-to-side stability of the truck frame when it is supporting a platform mounted boom.

It is another object of the invention to provide a method of mounting a stabilizing mechanism which can be added to a general purpose truck without modifying the truck frame as designed and constructed by the truck manufacturer.

Other objects and advantages of the invention will be apparent from the following detailed description and the accompanying drawings.

The present invention provides a method of mounting a stabilizing mechanism on a vehicle frame which is supported on a suspension assembly at opposite sides of the frame. The frame includes overload stops riveted to opposite sides of the frame and the suspension assembly includes bracket assemblies which secure the vehicle suspension springs to a wheel axle. The mounting method comprises the steps of removing the overload stop from each side of the vehicle frame and mounting a modified overload stop into the holes in the frame left from the removal of the overload stop. The modified overload stops each serve as both an overload stop and a support for the stabilizing mechanism. The mounting method further comprises removing from each side of the vehicle the top bracket from the bracket assembly and inserting a modified top bracket into each bracket assembly, the top bracket being modified to couple with the stabilizing mechanism. Further, the mounting method comprises mounting a torsion bar on the modified overload stops, the opposite ends of the torsion bar being coupled to the modified top bracket by linkages.

In further accordance with the invention, a stabilizing mechanism is provided which is supported on modified overload stops which are mounted onto the truck frame through mounting holes drilled by the truck's manufacturer and intended as mountings for conventional overload stops; in addition, linkages fixedly coupled to the longitudinal ends of the torsion bar directly couple each end of the torsion bar to one of the leaf springs of the truck frame. Differential compression of the leaf springs twists the torsion bar which produces a reactive torque at the longitudinal ends of the torsion bar. In response to this reactive torque, the linkages fixedly coupled to the torsion bar transfer the torque to a linear force which opposes the differential compression of the leaf springs. In order to couple the leaf springs to the torsion bar linkages, the top brackets in the bracket assemblies which secure the leaf springs to a wheel axle of the vehicle are replaced by modified top brackets. The modified brackets include integral pedestals which provide mountings for the torsion bar linkages. Both the modified overload stops and the modified top brackets replace the original stops and brackets without any need for modifying the vehicle frame or the bracket assemblies securing the leaf springs to the vehicle's wheel axle.

BRIEF DESCRIPTION OF THE DRAWINGS

FIG. 1 is a perspective view of a conventional general purpose truck frame carrying a boom and equipped with a stabilizing mechanism according to the present invention;

FIG. 2 is a plan view, partially in section taken along the line 2—2 in FIG. 1, of the truck frame and the stabilizing mechanism; and FIG. 3 is a section taken generally along line 3—3 in FIG. 2.

While the invention will be described in connection with a certain preferred embodiment, it will be understood that it is not intended to limit the invention to that particular embodiment. On the contrary, it is intended to cover all alternatives, modifications and equivalent arrangements as may be included within the spirit and scope of the invention as defined by the appended claims.

DETAILED DESCRIPTION OF THE PREFERRED EMBODIMENT

Turning now to the drawings, a boom 11 is mounted to a platform 13 which, in turn, is mounted to a truck frame 15 at a location immediately to the rear of the truck cab 17. The rear axle suspension for the truck is provided by leaf springs 19 and 21 which support the truck frame 15 on the rear axle 23. When the truck frame 15 tilts laterally in response to a shift in position of the boom 11, it is because one of the opposing leaf springs 19 or 21 is supporting a greater proportion of the total weight of the boom; therefore, the leaf spring supporting the greatest weight is compressed more than the opposing leaf spring and the truck frame tilts toward the side supporting the most weight. In order to improve the lateral stability of the truck frame 15 when the boom is moved and its center of gravity changed, a torsion bar 24 is transversely mounted on the truck frame rearwardly of the platform 13. By being coupled at its opposite ends to the suspension system of the truck frame, the torsion bar 24 resists the lateral swaying or tilting of the truck frame 15 caused by the changing position of the boom 11.

Inasmuch as the leaf springs 19 and 21 are symmetrically mounted onto opposite sides of the truck frame 15, only the mounting for leaf spring 19 will be described in detail. Similarly, since the torsion bar 19 is symmetrically mounted to each side of the truck frame 15 and also symmetrically coupled to each of the leaf springs 19 and 21, only the torsion bar's mounting and coupling associated with the leaf spring 19 will be described in detail.

In order to secure the leaf spring 19 to the rear axle 23, a bracket assembly 26 is provided which includes two U-bolts 25a and 25b having threaded ends which are received into four bore holes of a bottom bracket 27. The U-bolts are inverted and fitted over and around the leaf spring 19; their threaded ends extend downwardly below the rear axle 23 and the axle housing 31 and into the bore holes of the bottom bracket 27. A pair of nuts are fitted onto the threaded ends of each of the U-bolts. The nuts are tightened onto the threaded ends to capture the leaf spring 19, the axle 23 and the axle housing 31 between the tops of the inverted U-bolts 25a and 25b and the bottom bracket 27. In order to provide a proper mounting for the contact point between the leaf spring 19 and the axle housing 31, a spacer bracket 33 is fitted between the leaf spring 19 and the axle housing 31.

In order for the truck's wheel 35, the axle 23 and the leaf spring 19 to support the truck frame 15, two leaf spring mounts 37a and 37b are positioned and bolted to the truck frame 15 so as to receive the opposite ends of the leaf spring 19. Each leaf spring mount 37a or 37b captures an end of the leaf spring 19 by providing a horizontal surface against which the leaf spring 19 supports the weight of the truck. To prevent longitudinal movement of the leaf spring 19, a helper spring 19a is bolted at its opposite ends to the leaf spring mounts 37a and 37b. The helper spring 19a also holds the leaf spring 19 within the leaf spring mounts 37a and 37b when the truck frame is jacked up and the truck wheel 35 lifted off the ground.

In accordance with one important aspect of the invention each of the opposing ends of the torsion bar 24 is directly linked to one of the bracket assemblies and leaf springs 19 or 21. Any difference between the compression of the leaf spring 19 and that of leaf spring 21 will twist the torsion bar 24 thereby causing a reactive torque at the torsion bar ends which tends to reduce the difference between the compressions of the two leaf springs.

In accordance with another important aspect of the invention a top bracket 37 in the bracket assembly 26 has an integral pedestal 37a which provides a mount for a torsion bar linkage 39 and it is fitted between the top of the leaf spring 19 and the U-bolts 25a and 25b; in addition, a modified overload stop 41 is configured at its upper end to provide a mounting bracket for the torsion bar 24. Preferably, the top bracket 37 and the overload stop 41 provide a direct replacement for the manufacturer's original top bracket and overload stop, respectively. Specifically, the top bracket 37 is shaped to fit between the top of the leaf spring 19 and the U-bolts 25a and 25b without requiring adjustment or modification of the suspension assembly comprising the leaf spring 19, U-bolts 25a and 25b, bottom bracket 27, axle 23, axle housing 31 and spacer bracket 33. Similarly, the modified overload stop 41 is shaped to be fastened to the truck frame 15 in the same bolt holes used by the original overload stop. By substituting the top bracket 37 and the overload stop 41 for the bracket and stop supplied by the manufacturer, the torsion bar 24 can be mounted to the truck frame 15 and coupled to the leaf spring 19 without modifying the original suspension assembly or side beams 15a and 15b in a manner which might weaken the truck frame; for example, by bolting the overload stop 41 to the truck frame 15 by way of the original overload stop holes in the side beam 15a, the torsion bar 24 is mounted to the truck frame without the necessity of drilling additional holes into the truck frame 15.

Normally, conventional overload stops are riveted onto the truck frame by the truck manufacturer. In order to remove one of the overload stops so as to replace it with the modified overload stop 41, the rivets are burned off and the original stop is removed. The rivet holes in the truck frame's side beam 15a, which are exposed when the rivets have been burned off, are used to bolt the modified overload stop 41 onto the side beam. Since the second overload stop 43 is not needed to mount the torsion bar 24, it is not removed and replaced by a modified overload stop.

In order to mount the torsion bar 24 onto the modified overload stop 41, the stop is divided into bottom and top sections 41a and 41b, respectively. Section 41a is the bottom portion of the stop which is bolted to the truck frame and which includes an integral flange portion 41c. The flange portion 41c provides overload protection by stopping the leaf spring 19 from compressing to an extent which might damage the spring. The second overload stop 43 (the original stop) also has a flange portion 43a in FIG. 2. In order to receive the torsion bar 24, the top of the bottom overload stop section 41a includes a semi-circular recess which cradles one end of the cylindrical torsion bar 24. To provide a collar mount for the torsion bar 24, the top section 41b of the overload stop 41 includes a semi-circular recess to compliment the semi-circular recess in the bottom section 41a. In order to secure the top section 41b to the bottom section 41a, two bolts are received through two guide holes in the top section and into threaded bores in the bottom section.

In order to operatively connect the torsion bar 24 to the integral pedestal 37a of top bracket 37, the linkage 39 comprises a lever arm 45 and a pivot arm 47. One end of the lever arm 45 is rigidly connected to the torsion bar 24 and its opposite end is connected to the pedestal 37a by way of the pivot arm 47. The pivot arm 47 is pivotably connected at its opposite ends to the lever arm 45 and the pedestal 37a.

In operation, movement of the boom 11 toward one side of the truck frame 15 causes the boom's weight distribution on the truck frame to shift away from a stable central position. If there is an increase in the proportion of the total weight supported by the wheel 35, then the leaf spring 19 will tend to increase its compression; i.e., the distance between one side beam 15a of the truck frame 15 and the axle 23 will be decreased (the distance is indicated as $y_1$ in FIG. 3). At the same time, there is a decrease in the proportion of the total weight supported by the opposite wheel 49; accordingly, the leaf spring 21 will tend to relax and the distance $y_2$ in FIG. 3 will increase. Analogous to the distance $y_1$, the distance $y_2$ is measured between the truck frame's side beam 15b and the axle 23. In response to the difference in value between $y_1$ and $y_2$, the truck frame 15 is caused to tilt. Because the torsion bar 24 is directly linked to the leaf springs 19 and 21, the torsion bar twists in response to the unequal compression of the leaf springs so as to create a reactive torque at each end of the torsion bar. The reactive torque produces a force on the leaf springs which is proportional to $|y_2-y_1|$ and which tends to oppose the unequal compression of the leaf springs. Specifically, the linkages which rigidly connect the opposite ends of the torsion bar 24 to the leaf springs 19 and 21 transfer this reactive torque to a linear force which opposes any non-zero value of $|y_2-y_1|$.

From the foregoing it will be appreciated that the invention provides a mounting for a stabilizing torsion bar which does not interfere with the structural integrity of the truck frame. Furthermore, by coupling the opposite ends of the torsion bar directly to the leaf springs by way of a lever arm and a pivot arm, the stabilizing mechanism which results is not only effective but is also simple and easy to install.

I claim:

1. A method of mounting a stabilizing mechanism on a vehicle frame which is supported and biased on a suspension assembly at opposite sides of said frame, wherein said frame includes overload stops riveted to opposite sides of said frame and said suspension assembly includes bracket assemblies which secure the vehicle's suspension springs to a wheel axle, said method comprising the following steps:

removing an overload stop from each side of said vehicle frame;

mounting a modified overload stop on each side of said frame which serves as both an overload stop and a support for said stabilizing mechanism wherein said modified overload stop is mounted into the holes in the frame left from the removal of said overload stop;

removing from each side of said vehicle the top bracket from said bracket assembly;

inserting a modified top bracket into each bracket assembly wherein said top bracket assembly is modified to couple with said stabilizing mechanism; and mounting on said modified overload stops a torsion bar whose opposite ends are coupled to the modified top bracket by way of linkages.

2. The stabilizing mechanism mounting method of claim 1 wherein the vehicle suspension springs comprise opposing leaf springs mounted on the frame and wherein mounting a torsion bar on said modified overload stops includes fixedly coupling first and second linkages to the longitudinal ends of the torsion bar and connecting the linkages to the modified top brackets of the leaf springs so that differential compression of the leaf springs twists the torsion bar and creates a reactive torque at the ends of the torsion bar.

3. The stabilizing mechanism mounting method of claim 2 wherein mounting a modified overload stop includes providing a flange portion on the modified overload stop which functions as an overload stop for one of the leaf springs.

4. The stabilizing mechanism mounting method of claim 2 wherein connecting the linkages to the modified top brackets includes providing pedestals for coupling the opposing ends of the torsion bar to the leaf springs.

5. The stabilizing mechanism mounting method of claim 1 wherein the vehicle suspension springs include a first spring assembly located on one side of the vehicle frame and a second spring assembly located on the opposite side of the vehicle frame and wherein mounting the torsion bar on the modified overload stops includes coupling the longitudinal ends of the torsion bar to the first and second spring assemblies so as to twist the torsion bar in response to differential compression of the first and second spring assemblies and create a reactive torque which applies to the first spring assembly a first force in a first direction and applies to the second spring assembly a second force in a second and opposite direction such that said first and second forces retard the differential compression of the spring assemblies.

6. The stabilizing mechanism mounting method of claim 5 wherein coupling the longitudinal ends of the torsion bar to the spring assemblies comprises coupling first and second linkages between the longitudinal ends of the torsion bar and the first and second spring assemblies, respectively, with each linkage fixed to the longitudinal end of the torsion bar and pivotally mounted to the modified top brackets for the spring assembly such that the linkages convert and transfer the torque from the torsion bar to a linear force on the first and second spring assemblies.

* * * * *